Feb. 8, 1927.
R. F. RUNGE
1,616,827
SHEET METAL CAGE FOR ROLLER BEARINGS
Filed June 30, 1926
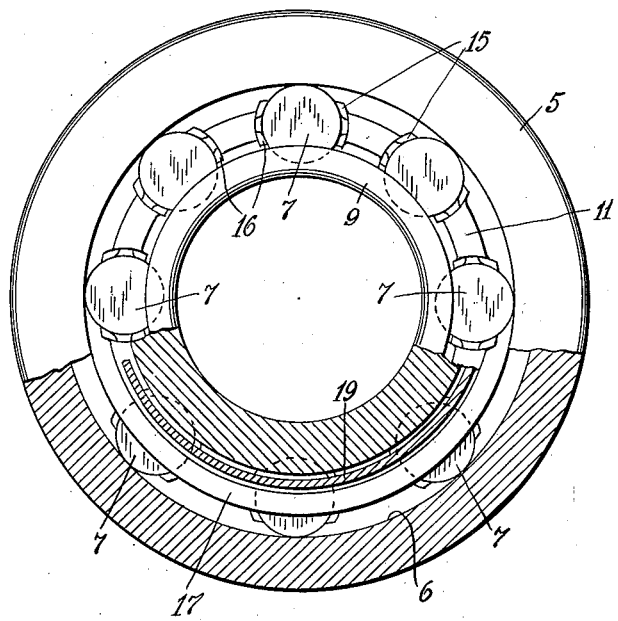
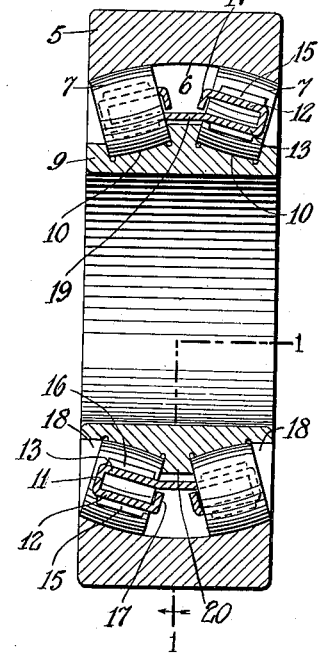
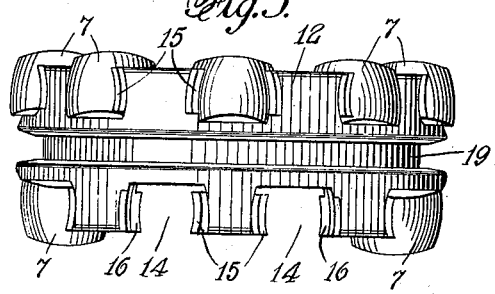
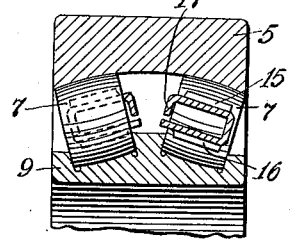
INVENTOR
Robert F. Runge
BY
ATTORNEY Patented Feb. 8, 1927.

1,616,827

UNITED STATES PATENT OFFICE.

ROBERT F. RUNGE, OF FOREST HILLS, NEW YORK, ASSIGNOR TO THE SKAYEF BALL BEARING COMPANY, OF HARTFORD, CONNECTICUT, A CORPORATION OF CONNECTICUT.

SHEET-METAL CAGE FOR ROLLER BEARINGS.

Application filed June 30, 1926. Serial No. 119,576.

This invention relates to sheet metal cages for roller bearings and is particularly useful in that type of bearing wherein the roller is curved in an axial direction, and in which there are generally two rows of such rollers so arranged on the inner race that the axes of the rollers of each row are disposed on a cone. Many of the features are adapted to other shaped rollers having their outer ends smaller than their inner ends.

In the drawings accompanying this specification my invention is illustrated applied to a roller bearing of the self-aligning type, in which drawings—
Figure 1 is an end elevation of a roller bearing, the lower part being shown in central section taken on about the plane indicated by the line 1—1 in Fig. 2.

Fig. 2 is a central longitudinal section of the bearing illustrated in Figure 1.

Fig. 3 is a perspective view of the cage illustrated in Figures 1 and 2 removed from the bearing rings but partly equipped with rollers, and Fig. 4 is a partial central longitudinal section of a bearing equipped with a modified form of the container.

The type of bearing upon which this invention is especially useful is the two row self-aligning roller bearing shown as having an outer ring, 5, provided with an inner spherical surface, 6, constituting the track for two rows of rollers, 7, these rollers being formed with a curvature in an axial direction having suitable radial relation to the radius of the sphere, 6. The bearing is also illustrated as having an inner ring, 9, formed with a pair of race grooves, 10, adapted to receive and guide the rollers in their movement.

In the cage structure shown in Figures 1, 2 and 3 the retainers for both rows of balls are formed from the same sheet metal blank. The form shown in Figure 4 comprises two retainer members separately formed each from its own blank. The advantages of both forms will be discussed further on in this description. The cage portion or retainer element for each row of rollers is shown comprising a conical truncated box like structure, the metal having a bend, 11, continuous with both sides, 12 and 13, of the box. At the smaller or outer end of each of the boxes there is formed through the bend and the outer edges of the side plates a series of notches, 14, of less depth than the length of the intended roller, for constituting roller sockets or pockets. The metal at the sides of each notch in both plates is illustrated in the nature of flaps preferably curved to conform to the contour of the intended roller. It will be seen that the flaps, 15, from the outer plate, 12, project outwardly and that the flaps, 16, from the inner plate, 13, project inwardly.

The smaller or outer end of the box as above explained is formed by the bend, 11. The inner end of the box is formed by an annular flange, 17, bent from one side plate, preferably the outer plate, 12, toward the other plate.

In some instances the rollers are assembled in the bearing and in position in the cage in the bearing and in position, which operation in by being snapped in, which operation in some instances is facilitated by means of suitable filling notches, 18, formed through the outer lands of the inner ring.

When this cage is used in a bearing as herein illustrated, and applied to heavy duty, wherein thrust loads as intermittently imposed in opposite directions, it is quite necessary that a certain amount of independence of movement or flexibility be permitted. According to the Figure 4 construction the two cage structures are entirely independent one of the other. This permits absolute independence of the retainers of the two sets of rollers. In some cases it is not necessary to have entire independence of movement on the two sides or it may be desirable to maintain a certain amount of predetermined relation of the two sets or rows of rollers. In Figures 2 and 3 this predetermined relation is shown as what may be termed evenly staggered, which for certain load conditions is regarded as ideal. For accomplishing the purpose of maintaining the rollers in their predetermined relation and also for the purpose of maintaining the predetermined distance apart of the two cage parts, it has been found desirable to connect them together by means of a flexible web, 19, which is preferably formed from one blank with the two cage boxes.

The cage in the forms illustrated is shown as riding upon the rollers and when the intermediate connecting web, 19, is employed this is preferably of sufficient dimensions to clear the adjacent perimeter of the land. In the form illustrated in Figure 2 the inner diameter of the web, 19, is larger than the outer diameter of the land, 20.

Having described my invention I claim and desire to secure by Letters Patent:

1. A cage, for a bearing of the type specified, formed of sheet metal and comprising; a box like structure for a row of rollers, the metal having a bend continuous with both sides of the box at one end, there being a series of notches formed through the bend and side plates at this end of a depth less than the length of the intended roller, an annular flange bent from one side plate toward the other forming the other end of the box, and flaps projecting from the side plates at the sides of each notch for engaging the roller.

2. A cage, for a bearing of the type specified, formed of sheet metal and comprising; a conical truncated box like structure for a row of rollers, the metal having a bend continuous with both sides of the box at the smaller end, there being a series of notches formed through the bend and side plates at this end of a depth less than the length of the intended roller, an annular flange bent from one side plate toward the other forming the other end of the box, and flaps projecting from the side plates at the sides of each notch for engaging the roller.

3. A cage for a roller bearing wherein the rollers are curved in an axial direction, formed of sheet metal and comprising; a box like structure for a row of rollers, the metal having a bend continuous with both sides of the box at one end, there being a series of notches formed through the bend and side plates at this end of a depth less than the length of the intended roller, an annular flange bent from one side plate toward the other forming the other end of the box, and flaps projecting from the side plates at the sides of each notch for engaging the roller, such flaps being curved to conform to the contour of the intended roller.

4. A cage for a roller bearing wherein the rollers are curved in an axial direction, formed of sheet metal and comprising; a conical truncated box like structure for a row of rollers, the metal having a bend continuous with both sides of the box at the smaller end, there being a series of notches formed through the bend and side plates at this end of a depth less than the length of the intended roller, an annular flange bent from one side plate toward the other forming the other end of the box, and flaps projecting from the side plates at the sides of each notch for engaging the roller, such flaps being curved to conform to the contour of the intended roller.

5. A cage for a roller bearing wherein the rollers are curved in an axial direction, formed of sheet metal and comprising; a box like structure for a row of rollers, the metal having a bend continuous with both sides of the box at one end, there being a series of notches formed through the bend and side plates at this end of a depth less than the length of the intended roller, an annular flange bent from one side plate toward the other forming the other end of the box, and flaps projecting from the side plates at the sides of each notch for engaging the roller, the cage being adapted to ride on the rollers.

6. A cage, for the rollers of a two row roller bearing wherein the rollers are smaller at their outer ends and those of each row have their axes disposed on a cone, the cage being formed of sheet metal and comprising; a pair of flexibly connected conical truncated box like structures for the rows of rollers, the metal having a bend continuous with both sides of each box at the smaller end, there being a series of notches formed through the bend and side plates at this end of a depth less than the length of the intended roller, an annular flange bent from one side plate toward the other forming the other end of the box, and flaps projecting from the side plates at the sides of each notch for engaging the roller.

7. A cage, for a bearing of the type specified, formed of sheet metal and comprising; a box like structure for a row of rollers, the metal having a bend continuous with both sides of the box at one end, there being a series of notches formed through the bend and side plates at this end of a depth less than the length of the intended roller, an annular flange bent from one side plate toward the other forming the other end of the box.

8. A cage, for a bearing of the type specified, formed of sheet metal and comprising; a conical truncated box like structure for a row of rollers, the metal having a bend continuous with both sides of the box at the smaller end, there being a series of notches formed through the bend and side plates at this end of a depth less than the length of the intended roller, an annular flange bent from one side plate toward the other forming the other end of the box.

9. A cage, for the rollers of a two row roller bearing wherein the rollers are smaller at their outer ends and those of each row have their axes disposed on a cone, the cage being formed of sheet metal and comprising; a pair of flexibly connected conical truncated box like structures for the rows of rollers, the metal having a bend continuous with both sides of each box at the smaller end, there being a series of notches formed through the bend and side plates at this end of a depth less than the length of the intended roller, an annular flange bent from one side plate toward the other forming the other end of the box.

10. A cage for the rollers of a two row roller bearing wherein the rollers are curved in an axial direction and those of each row have their axes disposed on a cone, the cage being formed of sheet metal and comprising; a pair of flexibly connected conical truncated box like structures for the rows of rollers, the metal having a bend continuous with both sides of each box at the smaller end, there being a series of notches formed through the bend and side plates at this end of a depth less than the length of the intended roller, an annular flange bent from one side plate toward the other forming the other end of the box, and flaps projecting from the side plates at the sides of each notch for engaging the roller.

11. A cage, for the rollers of a two row roller bearing wherein the rollers are curved in an axial direction and those of each row have their axes disposed on a cone, the cage being formed of sheet metal and comprising; a pair of flexibly connected conical truncated box like structures for the rows of rollers, the metal having a bend continuous with both sides of each box at the smaller end, there being a series of notches formed through the bend and side plates at this end of a depth less than the length of the intended roller, an annular flange bent from one side plate toward the other forming the other end of the box, and flaps projecting from the side plates at the sides of each notch for engaging the roller, such flaps being curved to conform to the contour of the intended roller.

Signed at New York, N. Y., this 25th day of June, 1926.

ROBERT F. RUNGE.